United States Patent
Chapman et al.

(10) Patent No.: US 9,509,619 B2
(45) Date of Patent: Nov. 29, 2016

(54) DISTRIBUTED PARALLEL COMPUTATION WITH ACCELERATION DEVICES

(71) Applicant: INTERNATIONAL BUSINESS MACHINES CORPORATION, Armonk, NY (US)

(72) Inventors: D. Gary Chapman, Poughkeepsie, NY (US); Rajaram B. Krishnamurthy, Poughkeepsie, NY (US); Toshio Suganuma, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/983,903

(22) Filed: Dec. 30, 2015

(65) Prior Publication Data

US 2016/0112332 A1   Apr. 21, 2016

Related U.S. Application Data

(63) Continuation of application No. 13/717,853, filed on Dec. 18, 2012, now Pat. No. 9,282,136.

(30) Foreign Application Priority Data

Jan. 6, 2012 (JP) .................. 2012-000972

(51) Int. Cl.
*G06F 15/16* (2006.01)
*H04L 12/825* (2013.01)
*H04L 29/08* (2006.01)

(52) U.S. Cl.
CPC ............... *H04L 47/25* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,075,994 A | * | 6/2000 | Bhat | H04L 29/06 370/229 |
| 8,825,964 B1 | * | 9/2014 | Sopka | G06F 3/0671 711/152 |
| 2004/0130927 A1 | * | 7/2004 | Schulz | G06Q 40/08 365/145 |

(Continued)

FOREIGN PATENT DOCUMENTS

JP        2011107732 A        6/2011

OTHER PUBLICATIONS

Chapman et al., U.S. Appl. No. 13/717,853 entitled "Distributed Parallel Computation With Acceleration Devices," filed with the U.S. Patent and Trademark Office on Dec. 18, 2012.

(Continued)

*Primary Examiner* — Wing F Chan
*Assistant Examiner* — Padma Mundur
(74) *Attorney, Agent, or Firm* — Cantor Colburn LLP

(57) ABSTRACT

A method for distributed computing between a host computer and at least one accelerator device interconnected through a network includes profiling a data transfer rate and a computation rate for a range of data sizes to find an optimal chunk size for the data transfer through the network; splitting or aggregating a size of the data stored in a memory in the host computer for encapsulating the data into a chunk with the optimal chunk size; dispatching the encapsulated data to the accelerator device; and instructing pipeline computation to the accelerator device with respect to the encapsulated data received.

16 Claims, 14 Drawing Sheets

(56) References Cited

U.S. PATENT DOCUMENTS

2010/0185803 A1* 7/2010 Gjoerup ............... G06F 13/385
 711/103
2011/0145447 A1* 6/2011 Dimond ................ G06F 13/28
 710/23

OTHER PUBLICATIONS

Junpei Kamimura, et al., Design and Evaluation of a GPU Accelerated Column Store Database, Technical Report of Information Processing Society of Japan 2011,[CD-ROM], Japan, Information Processing Society of Japan, Aug. 29, 2011, p. 1-7.

List of IBM Patents or Patent Applictions Treated As Related; (Appendix P), filed Mar. 4, 2016, 2 pages.

Partial Office Action translation for JP Application No. 2012-000972; dated Sep. 24, 2015; 2 pgs.

Yousuke Tamura, et al., Thorough use of the wonder 1 TFLOPS over power, Parallel processing by GPGPU, ASCII. technologies, vol. 14 No. 12,Japan, ASCII Media Works, Oct. 27, 2009, p. 78-87.

Jun Tatikawa, Massively parallel computing environment, GPGPU Programing, ASCII.technologies, vol. 15 No. 8, Japan, ASCII Media Works, Jun. 29, 2010, p. 36-47.

Kim et al., "A New Communication and Computation Overlapping Model with Loop Sub-Partitioning and Dynamic Scheduling," Korea Science and Engineering Foundation (KOSEF) 1997, 8 pages.

\* cited by examiner

1210
```
// execute a kernel computation on the buffer
clSetKernelArg(kernel, 0, sizeof(cl_mem), &buf);
clEnqueueNDRangeKernel(cmd, kernel, ...);
```

1220
```
for (int i = 0; i < num; i++) {
    // execute kernel computations on sub-buffers
    clSetKernelArg(kernel, 0, sizeof(cl_mem), &sub-buffer[i]);
    clEnqueueNDRangeKernel(cmd, kernel, ...);
}
// execute task kernel to combine intermediate results
clEnqueueTask(cmd, combineKernel, ...);
```

DISTRIBUTED PARALLEL COMPUTATION WITH ACCELERATION DEVICES

PRIORITY

This application claims priority to U.S. patent application Ser. No. 13/717,853, filed Dec. 18, 2012, which claims priority to Japanese Patent Application No. 2012-000972, filed Jan. 6, 2012, and all the benefits accruing therefrom under 35 U.S.C. §119, the contents of which in its entirety are herein incorporated by reference.

BACKGROUND

The present invention relates to a distributed computing technology, and more particularly relates to a distributed parallel computation using a plurality of accelerator devices.

Recently, a multi-processor computation using GPUs (Graphic Processor Units) has been widely used to enhance computation efficiency and/or computation speed. The GPUs are typically used as accelerators of a main CPU for enhancing the computation performance. Such multi-processor computation architecture often uses a GPU network connected over internal buses such as PCI or PCI-Express etc. Such GPUs connected by the internal buses are herein referred to tightly-coupled accelerator devices.

The GPUs are operated in parallel under control by a host CPU by an adequate programming language to enhance the computation performance. One example of such programming language may include OpenCL. OpenCL may be applied to manage data transfer between the host CPU and GPUs and may be utilized by this invention to minimize the performance cost of that transfer.

The multi-processor computation architecture in another scheme has been known such as for example, distributed computation or grid computation. These multi-processor computation architectures may include a plurality of servers or computers which share computations under control by a host computer or a master computer. In this type of multi-processor architecture, the computers are connected with an external bus network such as Ethernet (Trade Mark) and a network interface card using various physical connection protocols. The computers may support the entire computation executed within the network and hence the computers responsible to the distributed computing may also be regarded as the accelerators. However, the computers in such distributed computation architecture are connected by the external network though TCP/IP and the computers in the distributed computing system may be regarded as loosely-coupled accelerators.

In the loosely-coupled multi-processor system, the computers or nodes are connected by the external network and hence, data transfer between the host computer and the accelerator devices may be affected by transport conditions including data sizes, runtime implementation and network conditions.

Enhancement of the computation performance through TCP network also has been developed so far; for example, US Patent Application Publication 2008/029098A1 discloses a computer system which dynamically segments a large TCP segment with smaller TCP segments so as to reduce interrupt frequency. JP2011-170732 discloses the parallel computation method which divides a functional block into strands and modifies the functional block depending on computation time.

In the tightly-coupled acceleration architecture, it has been proposed that batching many small transfers into one larger transfer will improve the data transfer performance (reference NVIDIA OpenCL Best Practice Guide, Section 3.1 "Data Transfer between Host and Device"). In addition, Kim, et al. discloses, in "A New Communication and Computation Overlapping Model with Loop Sub-Partitioning and Dynamic Scheduling", a communication and computation overlapping model to hide the communication latency in data parallel programs.

SUMMARY

In one embodiment, a method for distributed computing between a host computer and at least one accelerator device interconnected through a network includes profiling a data transfer rate and a computation rate for a range of data sizes to find an optimal chunk size for the data transfer through the network; splitting or aggregating a size of the data stored in a memory in the host computer for encapsulating the data into a chunk with the optimal chunk size; dispatching the encapsulated data to the accelerator device; and instructing pipeline computation to the accelerator device with respect to the encapsulated data received.

In another embodiment, a computer readable storage medium having computer readable instructions stored thereon that, when executed by a computer, implement a method for distributed computing between a host computer and at least one accelerator device interconnected through a network. The method includes profiling a data transfer rate and a computation rate for a range of data sizes to find an optimal chunk size for the data transfer through the network; splitting or aggregating a size of the data stored in a memory in the host computer for encapsulating the data into a chunk with the optimal chunk size; dispatching the encapsulated data to the accelerator device; and instructing pipeline computation to the accelerator device with respect to the encapsulated data received.

In another embodiment, a host computer for distributed computing between the host computer and at least one accelerator device interconnected through a network includes a profiler part configured to profile a data transfer rate and a computation rate for a range of data sizes; a size optimizer part configured to find an optimal chunk size for the data transfer through the network from the profiled data transfer rate and the computation rate; a capsulation part configured to encapsulate the data stored in a memory of the host computer by splitting or aggregating into a chunk with the optimal chunk size; and a dispatch part configured to dispatch the encapsulated data to the accelerator device and instructing pipeline computation to the accelerator device with respect to the encapsulated data received.

In another embodiment, a distributed computing system is disclosed between a host computer and at least one accelerator device interconnected through a TCP/IP network, the accelerator device being implemented with an application program. The host computer includes a profiler part configured to profile a data transfer rate and a computation rate for a range of data sizes; a size optimizer part configured to find an optimal chunk size for the data transfer through the network from the profiled data transfer rate and the computation rate; a capsulation part configured to encapsulate the data stored in a memory of the host computer by splitting or aggregating into a chunk with the optimal chunk size; and a dispatch part configured to dispatch the encapsulated data to the accelerator and instructing pipeline computation to the accelerator with respect to the encapsulated data received; wherein the optimal chunk size is determined to be the data size where the computation and communication overlapping ratio is closest to 1 and, if there are multiple such data sizes, which has the highest data transfer rate between a minimum data size and a maximum data size; and wherein the dispatch part instructs multiple writes of the encapsulated data for numbers of chunks and instructs execution of operations of the accelerator on the encapsulated data upon receiving the encapsulated data.

BRIEF DESCRIPTION OF THE SEVERAL VIEWS OF THE DRAWINGS

FIG. 12 depicts the pseudo codes of the host, transforming the conventional kernel computation to the present invention kernel computation.

DETAILED DESCRIPTION

For the parallel computing architecture developed thus far, enhancement to reduce latency of the data transport through the network before computation can begin has not been fully addressed. Further, connecting fundamentally different platform architectures, (such as Power PC™ architecture, Intel™ architecture, and/or a mainframe architecture such as IBM SYSTEM 390, etc.) must override the differences between the computing platforms while optimizing the performance of the parallel computation through the loosely-coupled accelerators running application across the platforms.

An aspect of this invention provides a novel distributed parallel computation architecture which will mitigate differences between incongruous platforms comprising the application environment.

Still another aspect of the present invention provides a novel distributed computation architecture which may optimize data transfer rate and performance of the parallel computation.

Further, another aspect of the present invention provides a method, a program, a host computer and a system for executing parallel distributed computation for overriding differences between the platform architecture.

According to the present invention embodiments, the host computer and the accelerator devices are interconnected through the external network and the host optimizes a data size used for distributed computation in the present environment prior to transmitting application working set data to the accelerator devices. This optimal data size, termed the "chunk size", is based on actual measurements of the communication rate and the computation rate the accelerator device in the network. The host computers splits the application data into segments to encapsulate the data into the optimal chunk and then dispatches the encapsulated data to the accelerator devices as well as instructions for parallel computation for the encapsulated data.

The accelerator devices start the computation upon receiving each encapsulated data in parallel to the data transfer without waiting the entire application data such that the parallel computation efficiency may be improved by minimizing communication overhead caused by the data transfer through the loosely-coupled network.

In other words, each accelerator device receives the encapsulated data and instructions and, if necessary, waits for all data required for the computation to arrive (as dictated by the host instructions). Once the datum is assembled, the particular computation dictated by the host instructions (that is, the "kernel") is dispatched. Upon completion, output data is sent by the accelerator device to the host, again according to host encapsulation instructions.

Hereafter, the present invention will be described depending on particular embodiments; the described embodiments should be understood mere description of the best mode and should not be limitation of the present invention.

Figure 1:
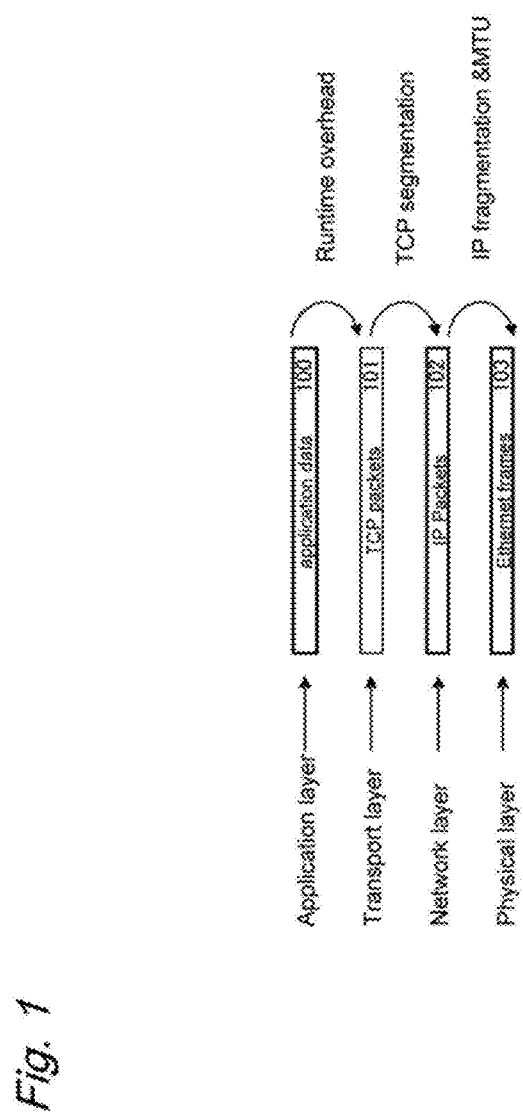
FIG. 1 shows data transfer costs of distributed computing in the loosely-coupled system.

Now referring to FIG. 1, data transfer costs of the distributed computing in the loosely-coupled system will be explained depending on OSI basic reference model. Each of the nodes in the system generally comprises the physical layer 103, a network layer 102, a transport layer 101 and an application layer 100. The physical layer 103 is responsible for receiving and sending ethernet (Trade Mark) frames; the network layer 102 is responsible to form IP packets with proper data sizes as payloads; the transport layer 101 forms TCP packets from data processed by the application in the application layer 100. The application layer 100 pays its cost as the runtime overhead by the computation of data with the applications.

The transport layer 101, the network layer 102 and the physical layer 103 contribute their respective processing costs and the overall cost to the application may depend on the data size transferred from the node to another node as TCP/IP packets. The above data size dependency, as opposed to the tightly-coupled system, may create extra costs for computation as well as scalability of the computation.

Figure 2:
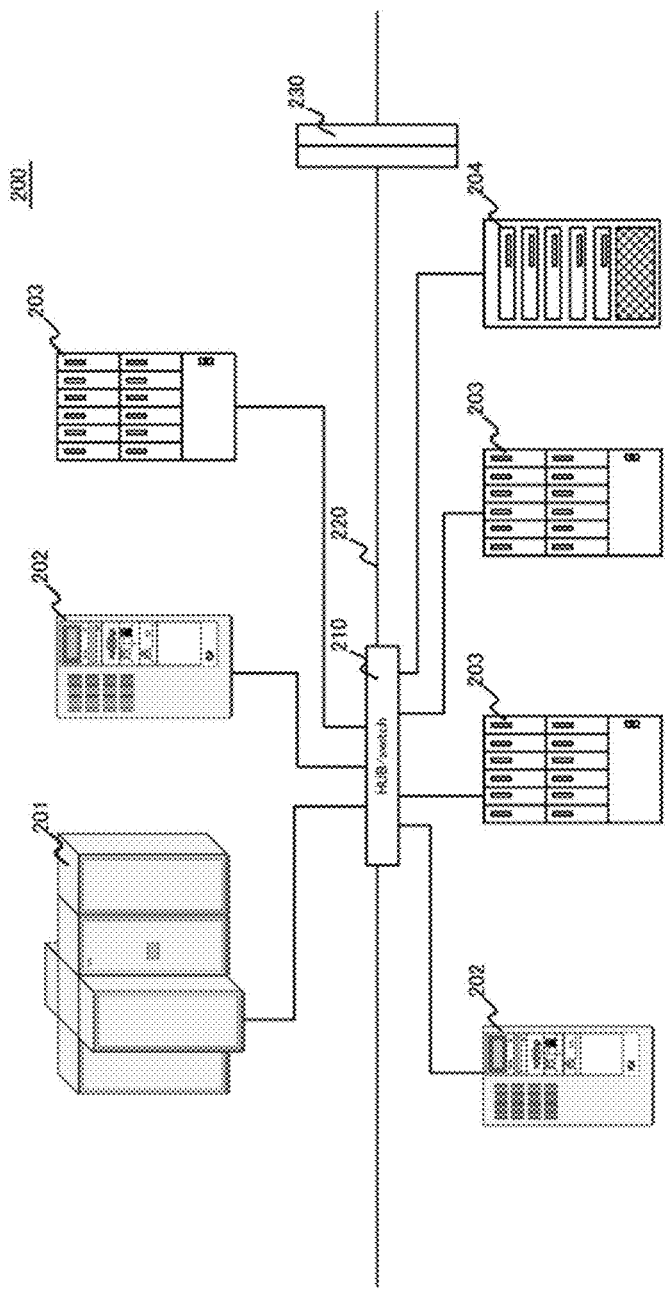
FIG. 2 shows a block diagram of a sample distributed computing system of the present invention.

FIG. 2 shows the block diagram of the sample distributed computing system 200 of the present invention. The system 200 comprises various computing platforms such as, for example, the main frame 201, the servers 202, the rack-mounted servers 203 in which the blade type servers are disposed in the rack. The main frame 201 may be selected from z system such as IBM system 390; however, other main frame with architecture may be used. The server 202 and the blade servers in the rack-mounted server 203 may comprise a CPU/CPUs such as IBM POWER and POWER PC (Trade Mark) which may be implemented as POWER (Trade Mark) series.

On the other hand, the platform 204 may comprise the CPU/CPUs such as Intel XEON (Trade Mark) which may conventionally referred to x86 architecture. The platforms depicted in FIG. 2 are each installed with different operating system and application programs so as to serve requested services from operators or users. The platforms are connected by an adequate network 220 such as Ethernet (trade Mark) or FTTH using optical communication through the hub and/or switch 210 and the router 230. The platforms may further comprise a RAM, a ROM, a hard disk drive, a network interface card in Giga bit rate etc. for providing business application services to operators.

The platforms communicate the data, commands and messages through TCP/IP protocol through the network and in the present invention, the platforms provide distributed computation environment as a loosely-coupled architecture. Although the distributed computation may be possible by using any known protocols or techniques, the OpenCL architecture may be useful in order to override the differences between the platforms while using already existing application resources.

Figure 3:
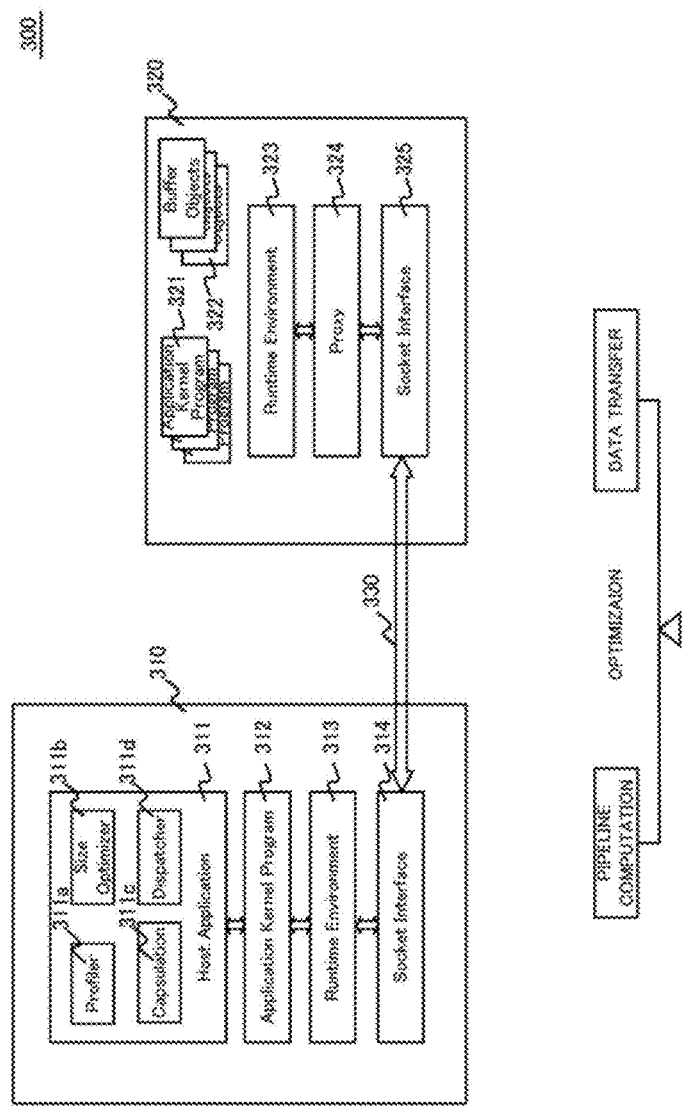
FIG. 3 shows a functional block diagram of the platforms for constructing the loosely-coupled system.

FIG. 3 shows the functional block diagram 300 of the platforms for constructing the loosely-coupled system. The platform 310 has a role of the host and the platform 320 has the role of the accelerator device. The term "accelerator device" or more simply referred to "accelerator" herein refers a separated computer or an information processing apparatus which communicate with the host to accelerate the entire computation of the host. The host comprises as its functional means the host application 311, the application kernel programs 312 implemented in the host 310, the runtime environment 313, and the socket interface 314.

The host application 311 comprises a profiler part 311a, a size optimizer part 311b, a capsulation part 311c, and a dispatcher part 311d. The profiler part profiles the data transfer rate and the computation rate for a range of data sizes from MIN_SIZE to MAX_SIZE; here, MIN_SIZE and MAX_SIZE are possible data sizes transferred between the host and the accelerator device in the application program. The size optimizer part 311b finds and determines an optimal chunk size for the data transfer through the network based on the profiled data transfer rate and the computation rate.

The capsulation part 311c encapsulates the data stored in a memory of the host computer by splitting or aggregating into a chunk with the optimal chunk size. The dispatcher part 311d dispatches the encapsulated data to the accelerator device together with instructions for pipeline computation to the accelerator device with respect to the encapsulated data received. The profiler 311a, the size optimizer 311b, the capsulation 311c, and dispatcher 311d may not be necessarily part of Host application 311, but some of them may be a part of runtime environment 313.

The host application 311 provides various services to users controlled by the kernel program 312 and in the described embodiment; the OpenCL APIs may be implemented as one module of the host application. The kernel program 312 may be implemented for ZOS, Unix (Trade Mark), Linux (Trade Mark), or Windows (Trade Mark) 200X server to control various operation of the host.

Particular embodiment of the host includes OpenCL kernel programs as one component of the kernel 312 for implementing loosely-coupled system. The runtime environment 313 comprises runtime libraries including OpenCL runtime, dynamic link libraries which support runtime condition of the host. The socket interface 314 transmits to the accelerator device 320 the TCP/IP packets by using socket communication and in the described embodiment, the socket send/receive, RDMA R/W methods or class may be implemented as one module for supporting OpenCL architecture.

The accelerator device 320 comprises the application kernels 321, buffer objects 322, the runtime environment 323, the proxy facilities 324 to the host 310, and the socket interface 325. The application kernels 321 provide requested services and the buffer objects 322 store various information used in the accelerator device 320 and in the described embodiments, the buffer objects 322 receive the input data and the commands as well as send the computed results from the application kernel program 321 as the accelerator device of the loosely-coupled system.

The runtime environment 323 comprises as its functional component OpenCL compiler and runtime libraries suitable for the architecture of the platform as well as executes the operation instructed by the host 310 together with the proxy facilities 324 being implemented with OpenCL functions. The socket interface 325 communicates to the host through the socket communication and comprises send/receive, RDMA R/W method or class to the host 310 through the network 330.

Thus, the loosely-coupled system includes two type of data processing costs; one is the computation and frame formation costs and the other is data transfer cost through the network. The two kinds of costs i.e., computation and data transfer may be preferably well balanced for smooth and efficient computation in the distributed computing environments to minimize wait time for communication latency. In other words, the data transfer rate and the computation must be optimized so as not to waste the hardware resources in the accelerator devices.

Figure 4:
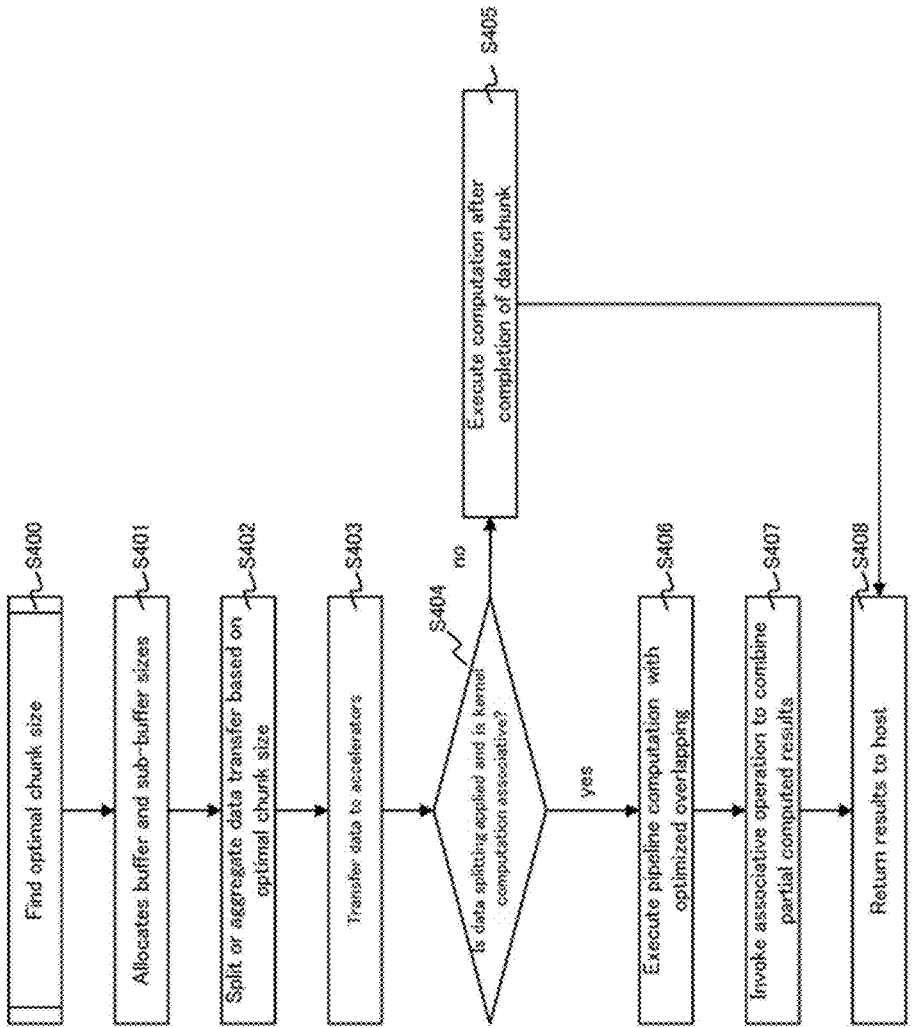
FIG. 4 shows a flowchart of the process of the present distributed computing system.

FIG. 4 shows a flowchart of the process of the present distributed computing system. The process of FIG. 4 starts from block S400 and the host examines the network conditions and hardware conditions of the accelerator devices to determine the optimal chunk size in the system. Although the details of block S400 will be described elsewhere, the host measures a response time of a test computation by the accelerator devices through the network in block S400. In block S401, the host allocates buffers and sub-buffer sizes for transferring the data. Here, the size of the buffer may be determined by the data size of the objected computation and the sub-buffer size may be set to the optimal chunk size, or vice versa, depending on whether data splitting or aggregation is applied in the described preferred embodiment.

In block S402, the data for the objected computation may be divided or aggregated such that the data size transferred to the accelerator device may be contained in the sub-buffer with the optimized size. Next in block S403, the host transmits the data with the optimal size together with the commands or instructions for computation in the accelerator device. In the described embodiment, the instruction of the computation on the accelerator device is coded by OpenCL language; however, other any distributed computation protocols may be used.

In block S404, the host determines whether or not the data splitting is applied and the application kernel task allocated to the accelerator device is associative, that is to say, whether the task can be applied with pipelined execution for split data. If so (yes), the host transfers instructions for initiating the pipelined computations to the accelerator device so as to execute the computation in the accelerators overlapped with data communication. If the task is not suitable to the pipeline computing (no), the host transfers conventional loosely-coupled computation instruction codes without pipelining and the process of FIG. 4 flows to block S405 to the accelerator devices.

Blocks S405-S408 are processes executed in the accelerator devices responsible for the computations. The accelerator devices receive the data and the instructions in block S405, the accelerator device waits until all of the data chunks are received because the computation is not associative and the speculative initiation of the computation is illegal. When the process flows to block S405, the accelerator device starts the computation after receiving the entire data for the computation and then returns the results of the computation to the host in block S408.

Now, when the determination in block S404 returns an affirmative result (yes), the process goes to block S406 and the accelerator device initiates the execution of the pipelined computation over the data chunks and the instructions received sequentially with the optimized computation-communication overlapping. The accelerator device continues the pipelined computation over the sequentially transmitted data chunks to the last and then the accelerator device invokes the associative operation to combine the partial results with the pipelined computation. Then, the accelerator device returns the computed results to the host to complete the commands received from the host.

Figure 5:
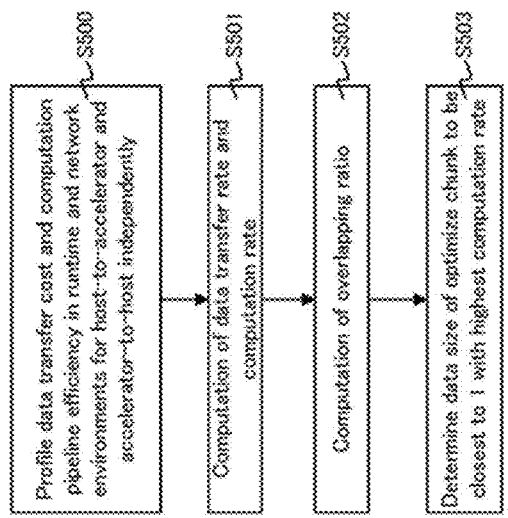
FIG. 5 shows the detailed process of "Find optimal chunk size" in FIG. 4.

FIG. 5 shows the detailed process of block S400 "Find optimal chunk size" in FIG. 4. The process begins from block S500 and the host starts to profile the data transfer cost and the computation pipeline effect in a given runtime and network environment for both host-to-accelerator and accelerator-to-host paths independently. Then in block S501, the host determines the data transfer rate and computation rate using proper sample computation set which are represented time duration referred to as elapsedTime1 and elapsedTime2; here elapsedTime1 and elapsedTime2 are variables obtained in the profiling process.

Then the host computes in block S502 the overlapping ratio using the parameters elapsedTime1 and elapsed Time2. The overlapping ratio is defined in the present embodiment that the ratio of transfer rate to computation rate which may be preferably one (1) when the data transfer rate and the computation rate are equal.

Further next, the host determines in block S503 the data size of the chunk to be optimized under the network-device performances such that the overlapping ratio may become closest to one (1) while providing higher data transfer rate. The host starts to prepare the instruction of computation to be transferred to the accelerator device using the optimal chunk size determined in block S400 in FIG. 4.

Figure 6:
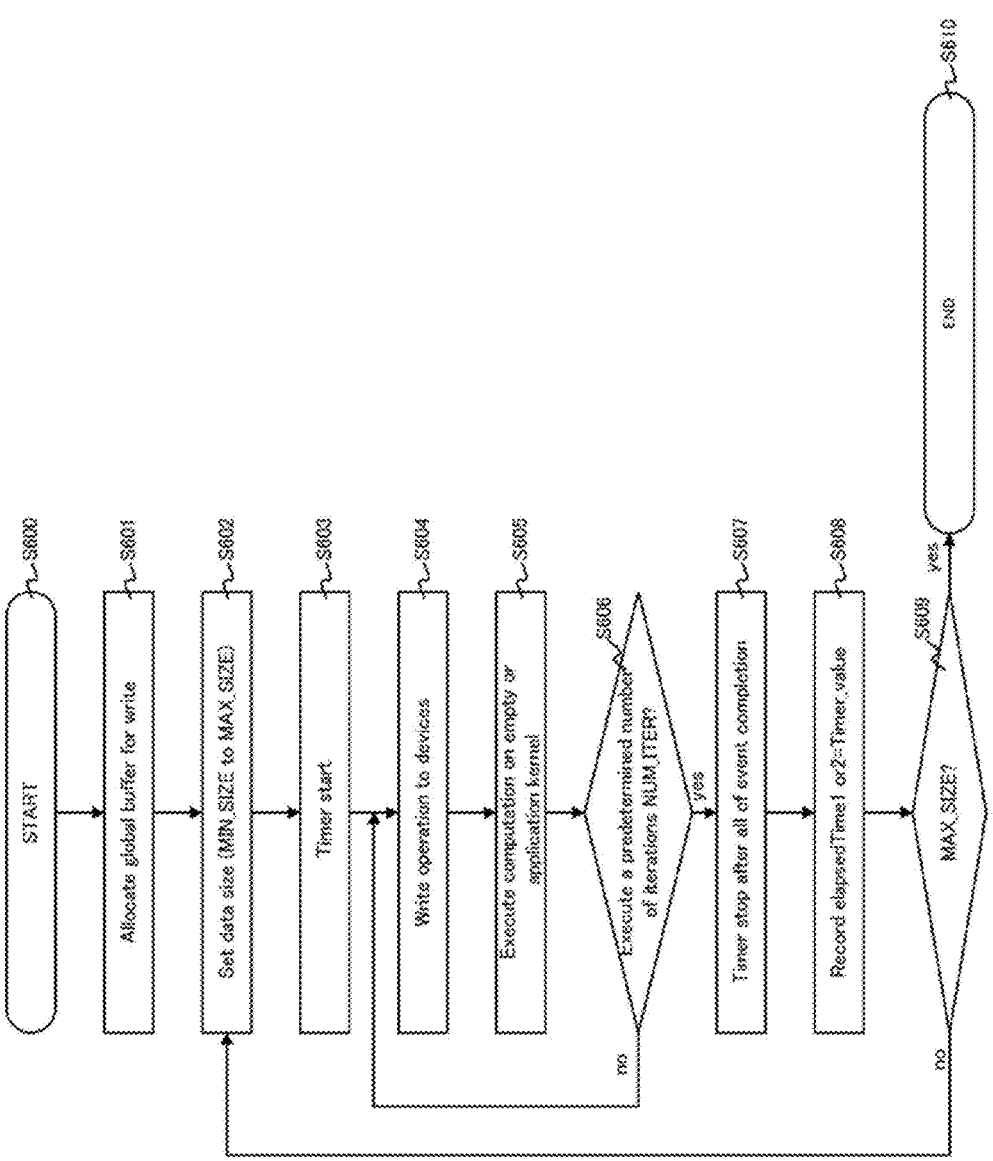
FIG. 6 shows detailed process of profiling the data transfer cost and computation cost for the host-to-accelerator path in FIG. 5.

FIG. 6 shows the detailed process of profiling the data transfer cost and computation cost in FIG. 5 (S500) for the host-to-accelerator (h2a) path. The process of FIG. 6 begins from block S600 and the host allocates the global buffer for write used for transferring the test computation data in block S 601, and then the host starts the timer object. Then, the host sets the size of sample data ranging from MIN_SIZE to MAX_SIZE in the buffer in order to find data transfer rate on the data size. In block S604, the host writes, i.e., dispatches the operation commands to invoke an empty kernel program or an application kernel program in the accelerator devices so as to execute the computation for a predetermined number of iterations NUM_ITER in block S605.

After executing a predetermined number of iterations (NUM_ITER) in block S606 (yes), the host determines whether or not all events dispatched to the accelerator device end until terminations of all events are confirmed. Block S606 may be executed so as to obtain more precise values of the transfer rate and the computation rate by repeating the process of S604 and S605 with the number defined by the parameter NUM_ITER. The term "events" is herein defined as a unit transaction of data write to the global buffer and subsequent execution of kernel program used to determine the transfer rate and/or computation rate. When all events complete, the host stops the timer object in block S607 and the $Timer_{13}$ value of the Timer object is set to the parameter elapsedTime1 or elapsedTime2 in block S608, depending on whether the purpose of measurements is for transfer rate only or both transfer rate and computation rate: the two kind of measurements sets different kind of parameters; however, the software module used therefore may be shared between the two measurements.

Next, the host examines whether or not the sample data size reaches MAX_SIZE and when the sample data does not reach MAX_SIZE in block S609 (no), the process is reverted to block S602 to repeat until the sample data size reaches MAX_SIZE. When the determination returns an affirmative result in block S609 (yes), then the process ends at block S610 to terminate the profiling. The parameter elapsedTime1 represents the total execution time when an empty kernel program is invoked and the parameter elapsedTime2 represents the total execution time when an application kernel program is invoked for the sample computation from the accelerator device, i.e., accelerator. The empty kernel program simply returns acknowledgements as soon as receiving input data from the host application without executing any computation in order to obtain the time required only for the data transfer, while the application kernel program executes the required computation in the application using the input data and returns the acknowledgements upon completion of the kernel computation.

In the h2a path for the non-associative computation, the transfer rate may be estimated by invoking an empty kernel program using the sample data of the size between MIN_SIZE and MAX_SIZE and the optimal chunk size may be determined as the data size which shows the highest data transfer rate.

Figure 7:
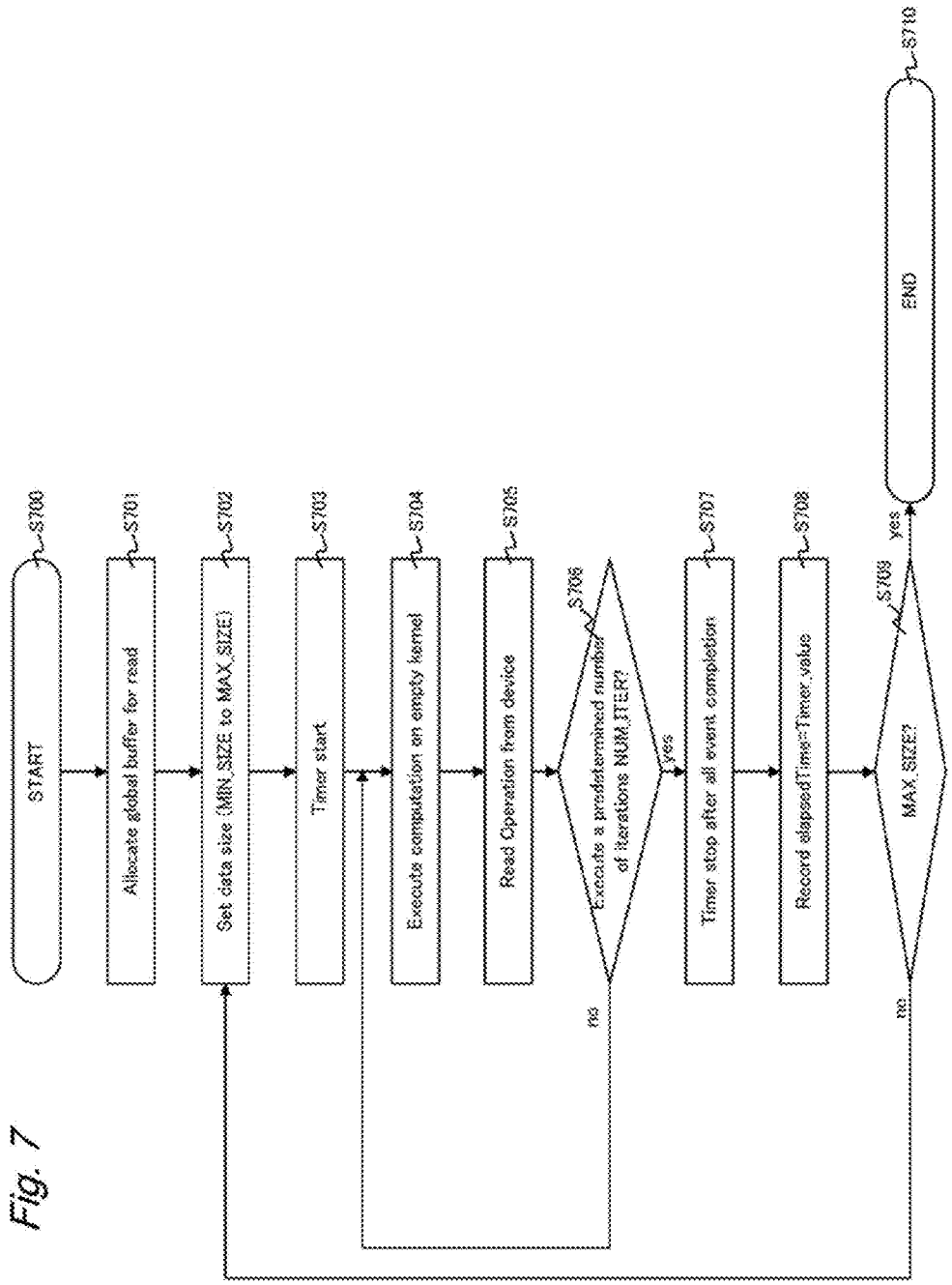
FIG. 7 shows the detailed process of profiling the data transfer cost and computation cost for the accelerator-to-host path in FIG. 5.

FIG. 7 shows the detailed process of profiling data transfer cost and computation cost in FIG. 5 (S500) for the accelerator-to-host (a2h) path. The transfer rate of the a2h path may be profiled by the data read rate of the host from the accelerator. The principal processes are almost similar to the process of FIG. 6 and hence further detailed explanation will be omitted.

According to the present embodiment, the parameters such as data transferRate, computationRate, and overlappingRatio are obtained from the results of the profiling and defined as follows:

--- transferRate=datasize*NUM_ITER/elapsedTime1
computationRate=datasize*NUM_ITER/(elapsedTime2-elapsedTime1)
overlappingRatio=transferRate/computationRate

--- wherein datasize*NUM_ITER is the total amount of data transferred during the measurements of elapsedTime1 or elapsedTime2.

More generally, the optimal data size may be determined to be the data size satisfying the condition that the value |1?overlappingRatio| is not more than a threshold while providing the highest transfer rate among the possible data sizes. The above threshold may be determined to be as close as zero (0) considering the overlapping requirement over the ranges of the transferRate and computationRate.

Figure 8:
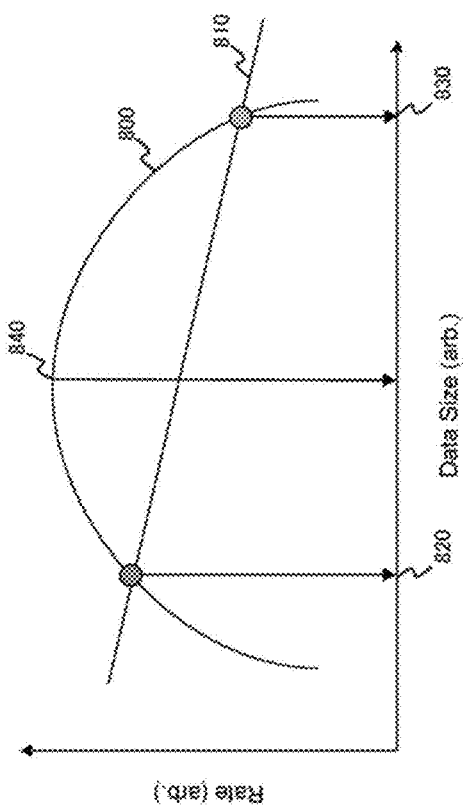
FIG. 8 shows the exemplary relations between the transferRate, the computationRate, and the data size.

FIG. 8 shows an exemplary relation between the transferRate 800, the computationRate 810, and the data size. The transferRate may be low both at the small data size end and the large data size end because of relatively higher TCP/IP runtime overheads such that the profile of the transferRate may typically be a convex showing the highest transfer rate at a medium data size point.

On the other hand, the computationRate may typically get lower with respect to the increase of the data size because the overhead of application kernel program can increase. In the case that the computationRate is higher than transferRate over the range of data size, which may be typically a case in the conventional network communication infra base, the crossing point is not present and then the optimal chunk size may be uniquely determined to be the data size of the maximum 840 of the convex curve so as to attain the largest overlappingRatio as defined above.

In turn, in the case that the transferRate and the computationRate are almost comparative, which is expected to occur in recent Gigabit Ethernet (Trade Mark) network communications or optical communications, it may have multiple crossing points as shown in FIG. 8; both of the crossing points satisfy the condition that the overlappingRatio to be as close as one (1). When the crossing points are present, the data size which has higher transferRate is adopted as the optimal chunk size according to the present invention.

The above determined data size may optimize the data transfer rate and the computation rate in the loosely-coupled distributed computing system. Herein above, the profiling process and the determination of the optimal chunk size has been explained. Now, the data processing for efficient parallel computation in the present invention will be explained.

Figure 9:
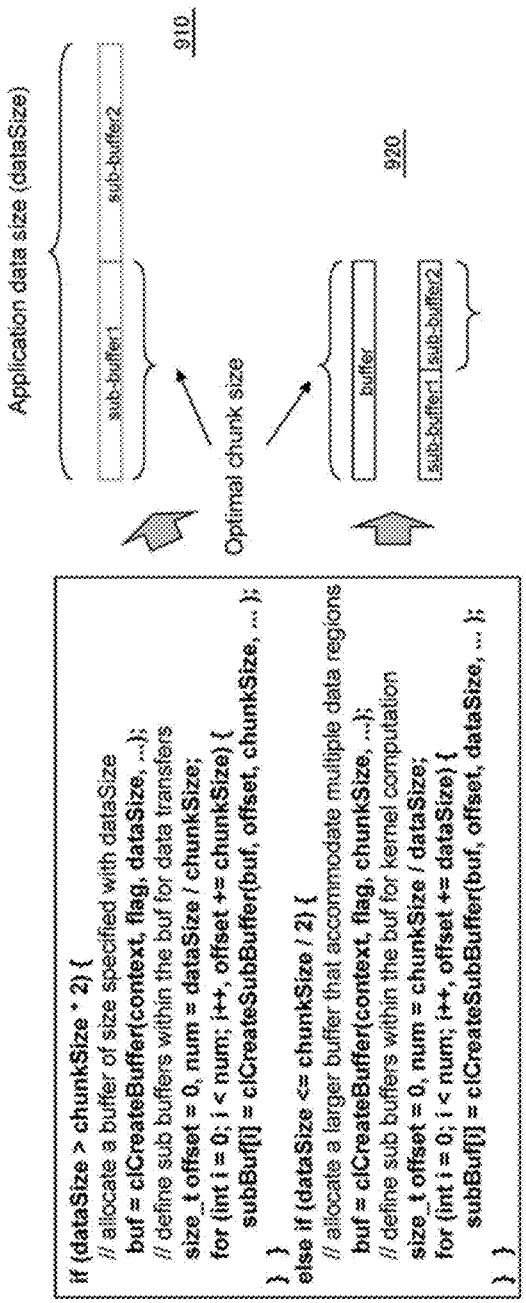
FIG. 9 shows an example of data buffer allocation for the accelerator devices, depending on the optimal chunk size and application data size.

FIG. 9 shows data processing when the data are transferred to the accelerator devices. In the embodiment of FIG. 9, the data buffers and sub-buffers are allocated based on the application data size and the optimal chunk size as shown in the pseudo code 900. When the application data size on the host is larger than (n*chunk size), the application data are split into at least n chunks corresponding to the sub-buffers on the accelerator device with the optimal chunk size as the application data 910 where the exemplary embodiment is explained by assuming n=2. When the application data size on the host is smaller than (chunk size/n), at least n application data are aggregated into one chunk with the optimal chunk size as the application data 920 where the exemplary embodiment is also explained with n=2.

Figure 10:
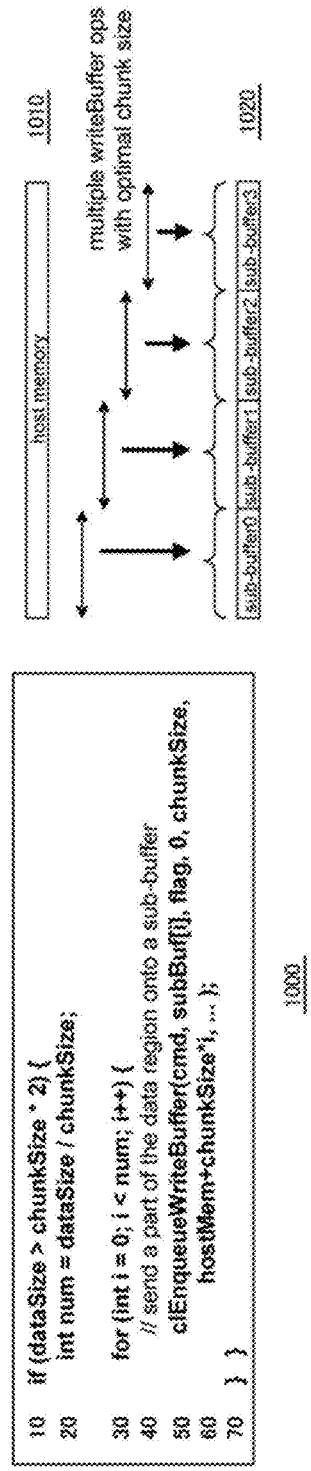
FIG. 10 shows an example of transferring the data in the case that the application data is larger than the size of optimal chunk.

Then, the data with the optimal chunk size are transferred to the accelerator device. FIG. 10 depicts the data transfer operation in the case that the application data size is larger than the size of optimal chunk. The pseudo code 1000 shown in FIG. 10 is described as a particular embodiment in OpenCL language and at line 10, the host determines whether or not the size of the application data dataSize is larger than chunkSize*2. When the dataSize is larger than chunkSize*2, the host determines at line 20 the number of sub-chunks. Here, the variable "dataSize" is the application data size to be transferred from the host to the accelerator device and the variable "chunkSize" is the optimal size of the chunk for encapsulating the data transferred.

Subsequently, the host transfers the application data at lines 30-70 by splitting the application data into the chunkSize until all of the application data in the host memory 1010 are transferred to the sub-buffer [i] 1020 of the accelerator device. Similar data processing for the data aggregation may be applied to the application data in the host memory when the application data size is smaller than the optimal chunk size.

Figure 11:
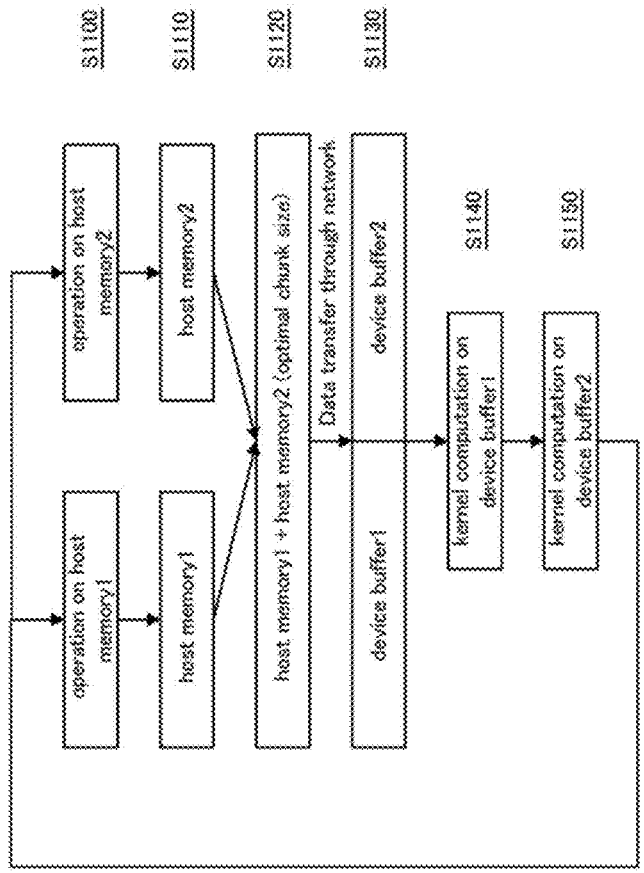
FIG. 11 shows an example of the data processing of the host and the accelerator device when the application data is smaller than the size of optimal chunk and thus to be aggregated upon transferring to the accelerator device.

FIG. 11 shows the data processing of the host and the accelerator device when the application data are aggregated upon transferring to the accelerator device. The host executes a particular operation on the data in the host memory 1 as well as the data in the host memory 2 in block S1100 so that the application data being smaller than one-half of the optimal chunk size; here the variable num is set to be equal to two (2) as shown at S1110. The host subsequently aggregates or encapsulates the application data into the chunk of optimal size in block S1120. The host then transfers the application data encapsulated into the chunk of optimal size to the accelerator device.

When the accelerator device receives the application data from the host, the accelerator device stores the application data in the accelerator device buffers corresponding to the numbers of aggregated data in block S1130. Then the accelerator device invokes application kernel programs to start kernel operation on the data in the accelerator device buffer 1 and in the accelerator device buffer 2 in block S1140 and S1150.

FIG. 12 depicts the pseudo codes of the host 1200 for executing the conventional kernel computation 1210 and the present invention kernel computation 1220 for associative operation. In the conventional process 1210, the application data are transferred in the data size determined by the application data prepared by the host and the accelerator device receives the data at one time; then accelerator device invokes the application kernel program to complete the kernel operation.

Alternatively according to the present invention provided as the pseudo code 1220, the application data are transferred with the optimal chunk size and the accelerator device invokes the application kernel programs to start the operation on the data upon receiving each chunk if the computation is associative. At the end, the accelerator device invokes the combination operation to combine the results obtained for the different chunks. In the present process, the accelerator device may apply pipeline operation on the application data so that the entire execution time on the application data may further be reduced together with the optimization of data transfer through TCP/IP network.

Figure 13:
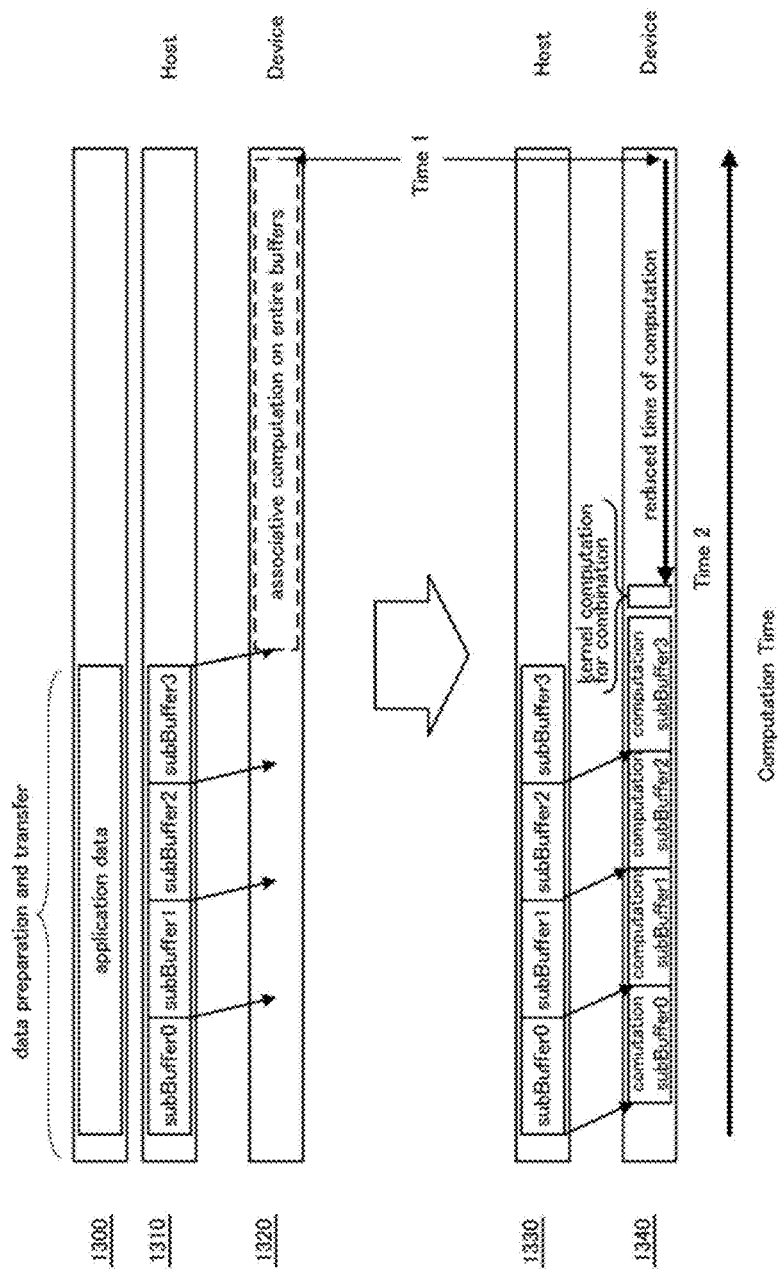
FIG. 13 shows the scheme of the improvement on the pipeline computation of FIG. 4.

FIG. 13 shows the scheme of the improvement on the pipeline computation of the present invention with referencing the conventional computation efficiency in the case of the associative computation. In the conventional computation 1300, the application data prepared in the host are transferred to the accelerator device with the application data size as is. The prepared non-optimized application data are transferred to the accelerator device.

When the application data are transferred with the optimal size as shown in the block 1310, the data transfer efficiency may be improved according to the present invention; however, when the kernel computation are invoked upon receiving the whole application data as shown in the block 1320, the accelerator device substantially wastes the computation resources until the application data has been completed because the pipeline computation is not applied in the accelerator device. In this case, the computation on the application data in the accelerator device ends at the time of Time 1.

In the present invention, the host generates the application data in the chunks with the optimal size as shown in the block 1330 and, if the kernel computation is associative, dispatches the instruction of pipeline computation such that the accelerator device immediately invokes the application kernel programs upon receiving a data chunk and starts the pipeline computation about the chunk. When the accelerator device completes the computation on all of the data chunks, the accelerator device invokes a task to combine those partial results on data chunks and to complete the task allocated to the accelerator device at the Time 2.

While the kernel computations are executed in parallel with the transmission of the data chunk such that the waste in the computation time may be minimized. As shown in the block 1340, the time required to execute the same task with pipelining, Time 2, is significantly shorter than Time 1 without pipeline operation and the present invention may significantly improve efficiency of the distributed computation with loosely-coupled architecture together with the usage of the accelerators.

Figure 14:
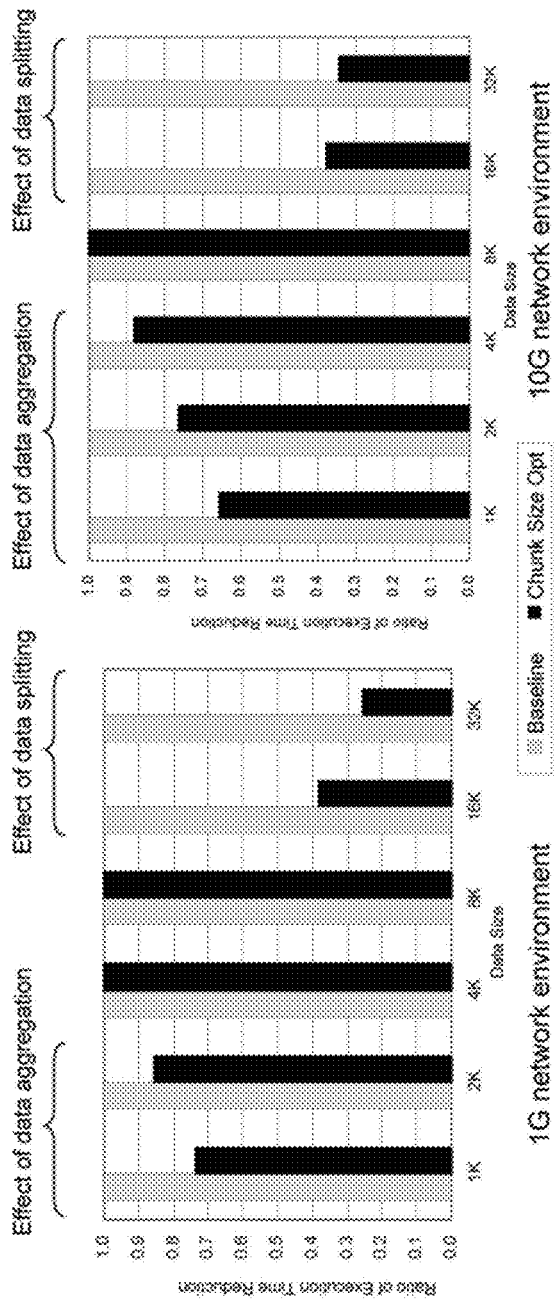
FIG. 14 shows the result of improvement of the computation performance in the system implemented with the present invention.

FIG. 14 shows the result of improvement of the computation performance in the system implemented with the present invention. The loosely-coupled system was constructed by IBM z/Enterprise platform (z196) and a blade server implemented with IBM POWER 7 connected with Ethernet (Trade Mark) of 1 G bps and 10 G bps.

The experimental was conducted by using Two-Step Cluster algorithm from SPSS (from IBM Corporation, e.g. referenced by the URL=http://www-01.ibm.com/software/analytics/spss/) with the OpenCL implementation. The experiments were conducted for data splitting and data aggregating trials with the conventional loosely-coupling system represented by block 1300 in FIG. 13.

In FIG. 14, the left hand side graph represents the results in 1 Gbps network environment and the right hand side graph represents the results in 10 Gbps network environment. In the both graphs, left-bars correspond to references and the right-bars correspond to the results of the present invention. As shown in FIG. 14, the present invention provide significant reduction of execution time when compared to the reference both in the data splitting case and the data aggregation case. The optimal chunk size was determined in the above condition to be 64K bytes for 1 G bps network and 128K bytes for 10 G bps network, which corresponds to 4K and 8K of the application data size, respectively.

The present invention has been described with reference to the embodiments shown in the drawings. However, the present invention is not limited to the embodiments shown in the drawings and various changes or other embodiments may be possible which are derived by a person skilled in the art, the true scope of the present invention may be determined by appended claims.

The invention claimed is:

1. A method for distributed computing between a host computer and an accelerator device interconnected through a network, the method comprising:
    profiling a data transfer rate from the host computer through the network to the accelerator device and a computation rate of the accelerator device for a range of data sizes to find an optimal chunk size for the data transfer through the network by measuring a response time of a test computation performed by the accelerator device through the network wherein the response time is measured based on kernel program acknowledgements received at the host computer;
    splitting or aggregating a size of a data stored in a memory in the host computer for encapsulating the data into a chunk with the optimal chunk size;
    dispatching the encapsulated data to the accelerator device; and
    instructing pipeline computation to the accelerator device with respect to the encapsulated data received.

2. The method of claim 1, wherein a ratio between the data transfer rate and the computation rate is computed from actual transmission time durations.

3. The method of claim 1, wherein the optimal chunk size is determined to be the data size which has the highest data transfer rate between a minimum data size and a maximum data size transmitted during the profiling in relation to the computation rate.

4. The method of claim 1, wherein the instructing pipeline computation further comprises:
    instructing multiple writes of the encapsulated data for numbers of chunks into buffer objects in the accelerator device; and
    instructing execution of operations of the accelerator device on the encapsulated data upon receiving the encapsulated data.

5. The method of claim 1, wherein the data size is subjected to the splitting in a case where the data size is larger than the optimal chunk size and the data size is subjected to the aggregating in a case where the data size is smaller than the optimal chunk size for the encapsulation of the data.

6. The method of claim 1, wherein the accelerator device is selected from a computer being implemented with an application program.

7. The method of claim 1, wherein the accelerator device is networked to the host computer with the TCP/IP network.

8. A non-transitory computer readable storage medium having computer readable instructions stored thereon that, when executed by a computer, implement a method for distributed computing between a host computer and at least one accelerator device interconnected through a network, the method comprising:
    profiling a data transfer rate from the host computer through the network to the accelerator device and a computation rate of the accelerator device for a range of data sizes to find an optimal chunk size for the data transfer through the network by measuring a response time of a test computation performed by the accelerator device through the network wherein the response time is measured based on kernel program acknowledgements received at the host computer;
    splitting or aggregating a size of a data stored in a memory in the host computer for encapsulating the data into a chunk with the optimal chunk size;
    dispatching the encapsulated data to the accelerator device; and
    instructing pipeline computation to the accelerator device with respect to the encapsulated data received.

9. The computer readable storage medium of claim 8, wherein a ratio between the data transfer rate and the computation rate is computed from actual transmission time durations.

10. The computer readable storage medium of claim 8, wherein the optimal chunk size is determined to be the data size which has the highest data transfer rate between a minimum data size and a maximum data size transmitted during the profiling in relation to the computation rate.

11. The computer readable storage medium of claim 8, wherein the instructing pipeline computation further comprises:

instructing multiple writes of the encapsulated data for numbers of chunks into buffer objects in the accelerator device; and instructing execution of operations of the accelerator on the encapsulated data upon receiving the encapsulated data.

12. The computer readable storage medium of claim 8, wherein the data size is subjected to the splitting in the case where the data size is larger than the optimal chunk size and the data size is subjected to the aggregation in the case where the data size is smaller than the optimal chunk size for the encapsulation of the data.

13. The computer readable storage medium of claim 8, wherein the accelerator device is selected from a computer being implemented with an application program and the accelerator device is networked to the host computer with the TCP/IP network.

14. A host computer for distributed computing between the host computer and at least one accelerator device interconnected through a network, the host computer comprising:
   a memory;
   one or more processors coupled to the memory, executing:
      a profiler part configured to profile a data transfer rate from the host computer through the network to the accelerator device and a computation rate of the accelerator device for a range of data sizes to find an optimal chunk size for the data transfer through the network by measuring a response time of a test computation performed by the accelerator device through the network wherein the response time is measured based on kernel program acknowledgements received at the host computer;
      a size optimizer part configured to find an optimal chunk size for the data transfer through the network from the profiled data transfer rate and the computation rate;
      an encapsulation part configured to encapsulate a data stored in a memory of the host computer by splitting or aggregating into a chunk with the optimal chunk size; and
      a dispatch part configured to dispatch the encapsulated data to the accelerator device and instructing pipeline computation to the accelerator device with respect to the encapsulated data received.

15. The host computer of claim 14, wherein the optimal chunk size is determined to be the data size which has the highest data transfer rate between a minimum data size and a maximum data size transmitted by the profiler part in relation to the computation rate.

16. The host computer of claim 14, wherein the dispatch part instructs multiple writes of the encapsulated data for numbers of chunks into buffer objects in the accelerator device and instructs execution of operations of the accelerator on the encapsulated data upon receiving the encapsulated data.

* * * * *